United States Patent
Field et al.

(10) Patent No.: US 6,435,535 B1
(45) Date of Patent: Aug. 20, 2002

(54) TRAILER FOR BALANCING VEHICLE

(75) Inventors: J. Douglas Field, Bedford; John David Heinzmann, Manchester, both of NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 09/516,384

(22) Filed: Mar. 1, 2000

(51) Int. Cl.$^7$ ............................................... B62K 27/00
(52) U.S. Cl. ........................ 280/204; 180/218; 280/492; 280/458
(58) Field of Search .................. 180/218, 21; 280/204, 280/292, 492, 494, 504, 400, 458, 456.1, 426

(56) References Cited

U.S. PATENT DOCUMENTS

| | | | |
|---|---|---|---|
| 584,127 A | 6/1897 | Draullette et al. | |
| 1,551,610 A | * 9/1925 | Ohman | ........................ 280/458 |

(List continued on next page.)

FOREIGN PATENT DOCUMENTS

| | | |
|---|---|---|
| DE | 29 07 509 A1 | 2/1979 |
| DE | 31 28 112 A1 | 2/1983 |
| DE | 32 42 880 A1 | 6/1983 |
| EP | 0 109 927 | 7/1984 |
| EP | 0 193 473 | 9/1986 |
| EP | 0 537 698 A1 | 4/1993 |
| FR | 980 237 | 5/1951 |
| FR | 71.26024 | 3/1972 |
| FR | 2 502 090 | 9/1982 |
| GB | 150393 | 5/1919 |
| GB | 1213930 | 11/1970 |
| GB | 2 139 576 A | 11/1984 |
| JP | 52-44933 | 10/1975 |
| JP | 57-87766 | 6/1982 |
| JP | 0255580 | 12/1985 |
| JP | 63-305082 | 12/1988 |
| JP | 01316810 | 12/1989 |
| JP | 6-105415 | 12/1989 |
| JP | 02292185 | 3/1990 |
| JP | 4-19206 A | * 5/1990 | ............ B60D/1/14 |
| JP | 2-190277 | 7/1990 |
| JP | 4-201793 | 7/1992 |
| JP | 7255780 | 3/1995 |
| WO | WO 89/06117 | 7/1989 |
| WO | WO 96/23478 | 8/1996 |

OTHER PUBLICATIONS

Osaka et al., Stabilization of Unicycle, *Systems and Control*, Vo. 25, No. 3, Japan 1981, pp. 159–166 (Abstract only).

Kawaji, S., Stabilization of Unicycle Using Spining Motion, *Denki Gakkai Ronbushi*, D, vol. 107, Issue 1, Japan, (1987), pp. 21–28.

Schoonwinkel, A., *Design and Test of a Computer–Stabilized Unicycle*. Stanford University (1988), UMI Dissertation Services.

Vos, D., *Dynamics and Nonlinear Adaptive Control of an Autonomous Unicycle*, Massachusetts Institute of Technology, 1989.

(List continued on next page.)

Primary Examiner—Brian L. Johnson
Assistant Examiner—J. Allen Shriver
(74) Attorney, Agent, or Firm—Bromberg & Sunstein LLP

(57) ABSTRACT

A trailer for a dynamically balanced transporter that allows leaning of the transporter such as for control of the combination of transporter and trailer. The trailer has a platform and an arm with two ends, one of which ends is coupled to the platform and the other of which is pivotally coupled about a horizontal axis to the transporter. The trailer has a ground-contacting member that may be a wheel, or a ski or a skid. A locking mechanism may lock the pivot in response to a fault condition. The platform of the trailer may support a rider in a seated or standing position and may have a characteristic transverse linear dimension comparable to the shoulder width of the rider.

2 Claims, 6 Drawing Sheets

U.S. PATENT DOCUMENTS

| | | | | |
|---|---|---|---|---|
| 1,739,716 A | | 12/1929 | Fisher | |
| 2,742,973 A | | 4/1956 | Johannesen | |
| 2,913,256 A | * | 11/1959 | Sharpe | 280/458 |
| 3,145,797 A | | 8/1964 | Taylor | |
| 3,260,324 A | | 7/1966 | Suarez | |
| 3,288,234 A | | 11/1966 | Feliz | |
| 3,348,518 A | | 10/1967 | Forsyth et al. | |
| 3,374,845 A | | 3/1968 | Selwyn | |
| 3,399,742 A | * | 9/1968 | Malick | 180/21 |
| 3,580,344 A | | 5/1971 | Floyd | |
| 3,596,298 A | | 8/1971 | Durst, Jr. | |
| 4,088,199 A | | 5/1978 | Trautwein | |
| 4,109,741 A | | 8/1978 | Gabriel | |
| 4,222,449 A | | 9/1980 | Feliz | |
| 4,354,569 A | | 10/1982 | Eichholz | |
| 4,375,840 A | | 3/1983 | Campbell | |
| 4,566,707 A | | 1/1986 | Nitzberg | |
| 4,624,469 A | | 11/1986 | Bourne, Jr. | |
| 4,645,230 A | * | 2/1987 | Hammons | 280/656 |
| 4,657,272 A | | 4/1987 | Davenport | |
| 4,709,772 A | | 12/1987 | Brunet | |
| 4,790,548 A | | 12/1988 | Decelles et al. | |
| 4,794,999 A | | 1/1989 | Hester | |
| 4,802,542 A | | 2/1989 | Houston et al. | |
| 4,809,804 A | | 3/1989 | Houston et al. | |
| 4,874,055 A | | 10/1989 | Beer | |
| 4,998,596 A | | 3/1991 | Miksitz | |
| 5,011,170 A | * | 4/1991 | Forbes et al. | 280/204 |
| 5,052,237 A | | 10/1991 | Reimann | |
| 5,111,899 A | | 5/1992 | Reimann | |
| 5,248,007 A | | 9/1993 | Watkins et al. | |
| 5,314,034 A | | 5/1994 | Chittal | |
| 5,350,033 A | | 9/1994 | Kraft | |
| 5,366,036 A | | 11/1994 | Perry | |
| 5,655,615 A | * | 8/1997 | Mick | 180/24.02 |
| 5,701,965 A | | 12/1997 | Kamen et al. | |
| 5,718,534 A | * | 2/1998 | Neuling | 404/94 |
| 5,791,425 A | | 8/1998 | Kamen et al. | |
| 5,873,582 A | * | 2/1999 | Kaufman, Jr. et al. | 280/7.12 |
| 5,921,844 A | * | 7/1999 | Hollick | 446/450 |
| 5,947,505 A | | 9/1999 | Martin | |
| 5,971,091 A | * | 10/1999 | Kamen et al. | 180/218 |

OTHER PUBLICATIONS

Vos, D., *Nonlinear Control of an Autonomous Unicycle Robot: Practical Issues*, Massachusetts Institute of Technology, 1992.

Koyanagi et al., A Wheeled Inverse Pendelum Type Self–Contained Mobile Robot and Its Posture Control and Vehicle Control, *The Society of Instrument and Control Engineers*, Special issue of the $31^{st}$ SICE Annual Conference, Japan 1992, pp. 13–16.

Koyanagi et al., A Wheeled Inverse Pendulum Type Self–Contained Mobile Robot, *The Society of Instrument and Control Engineers*, Special issue of the $31^{st}$ SICE Annual Conference, Japan 1992, pp. 51–56.

Koyanagi et al., A Wheeled Inverse Pendulum Type Self–Contained Mobile Robot and its Two Dimensional Trajectory Control, *Proceeding of the Second International Symposium on Measurement and Control in Robotics*, Japan 1992, pp. 891–898.

News article Amazing Wheelchair Goes Up and Down Stairs.

Roy et al., Five–Wheel Unicycle System, *Medical & Biological Engineering & Computing*, vol. 23, No. 6, United Kingdom 1985, pp. 593–596.

Kawaji, S., Stabilization of Unicycle Using Spinning Motion, *Denki Gakkai Ronbushi, D*, vol. 107, Issue 1, Japan 1987, pp. 21–28 (Abstract Only).

Osaka et al., Stabilization of Unicycle, *Systems and Control*, Vo. 25, No. 3, Japan 1981, pp. 159–166 (Abstract only).

* cited by examiner

TRAILER FOR BALANCING VEHICLE

TECHNICAL FIELD

The present invention pertains to trailers that may be attached to a balancing vehicle, and more particularly, to an attachment mechanism that permits tilting action of the balancing vehicle.

BACKGROUND ART

Vehicles for transportation of individual persons may provide stabilization in one or both of the fore-aft or left-right planes, such as when no more than two wheels are in ground contact at a time. Vehicles of this sort may be operated in a mode in which motion of the vehicle, including acceleration (both linear and turning), is controlled partially or entirely by leaning of the vehicle as caused by a subject riding the vehicle. Vehicles whose stability with respect to fore-aft overturning is substantially affected by the orientation of the user on the vehicle will be referred to as "dynamically balanced" vehicles for purposes of this description and any appended claims. One such vehicle is shown in FIG. 1, while various other such vehicles are described in U.S. Pat. No. 5,971,091, and U.S. application Ser. No. 09/325,976, which patent and application are both incorporated herein by reference.

FIG. 1 shows a prior art personal transporter, designated generally by numeral 18, that lacks static stability and that balances during the course of ordinary operation. A subject 10 stands on a support platform 12 and holds a grip 14 on a handle 16 attached to the platform 12, so that vehicle 18 may be operated in a manner analogous to a scooter. A control loop may be provided so that leaning of the subject results in the application of torque to wheel 20 about axle 22 thereby causing an acceleration of the vehicle. Vehicle 18 may have one or more yaw controls 28, such as a thumbwheel or thumb dial, for example, to enable subject 10 to steer the vehicle about a vertical axis z perpendicular to the plane defined by the direction of motion x and a transverse axis y.

SUMMARY OF THE INVENTION

In accordance with preferred embodiments of the present invention, there is provided a trailer for a dynamically balanced transporter that has a support and an attachment housing coupled to the support. The trailer has a platform and an arm with two ends, one of which ends is coupled to the platform and the other of which is pivotally coupled, about a horizontal axis to the attachment housing. Finally, the trailer has a ground-contacting member coupled to the platform.

In accordance with alternate embodiments of the invention, the ground-contacting member may be a wheel or a ski or a skid. The trailer may further have a locking mechanism for locking the pivot in response to a stabilization fault condition.

In accordance with another aspect of the invention, there is provided a rider support trailer for a dynamically balanced transporter having a support and an attachment coupled to the support. The rider support trailer has a base having a bottom side and a top side and a pivot coupled to the base for permitting motion of the base about a horizontal axis with respect to the support of the transporter. The rider support trailer also has a ground-contacting member coupled to the bottom side of the base and a substantially vertical support column coupled to the top surface of the base, and a rider support that may be a seat coupled to the support column.

In accordance with a further aspect of the invention, the platform of a trailer for supporting a user in a standing position may have a characteristic transverse linear dimension substantially comparable to the shoulder width of the user.

BRIEF DESCRIPTION OF THE DRAWINGS

The invention will be more readily understood by reference to the following description, taken with the. accompanying drawings, in which.

DETAILED DESCRIPTION OF SPECIFIC EMBODIMENTS

Figure 1:
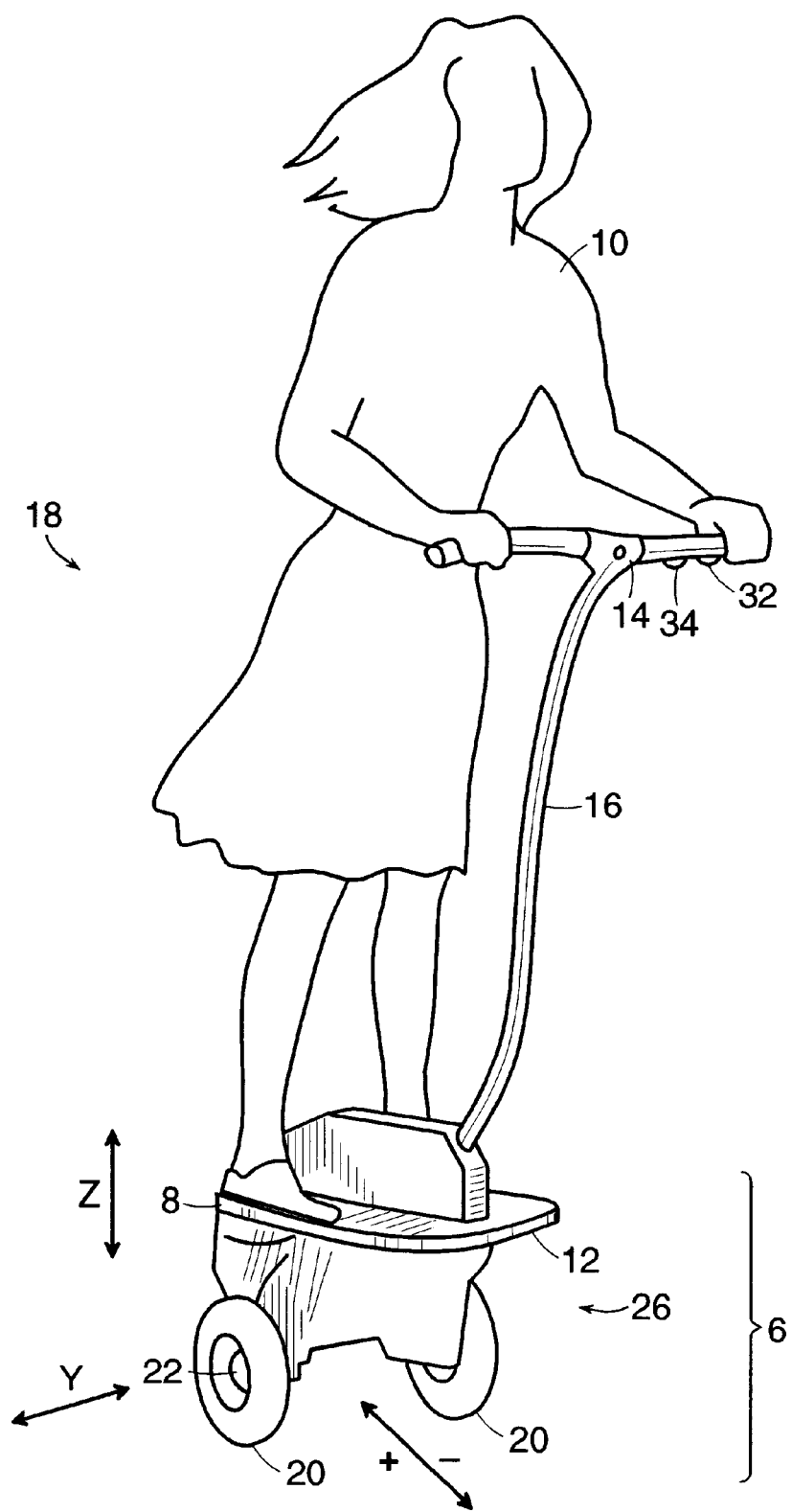
FIG. 1 is a side view of a prior art dynamically balancing vehicle of the type in which an embodiment of the invention may be advantageously employed.
Figure 2:
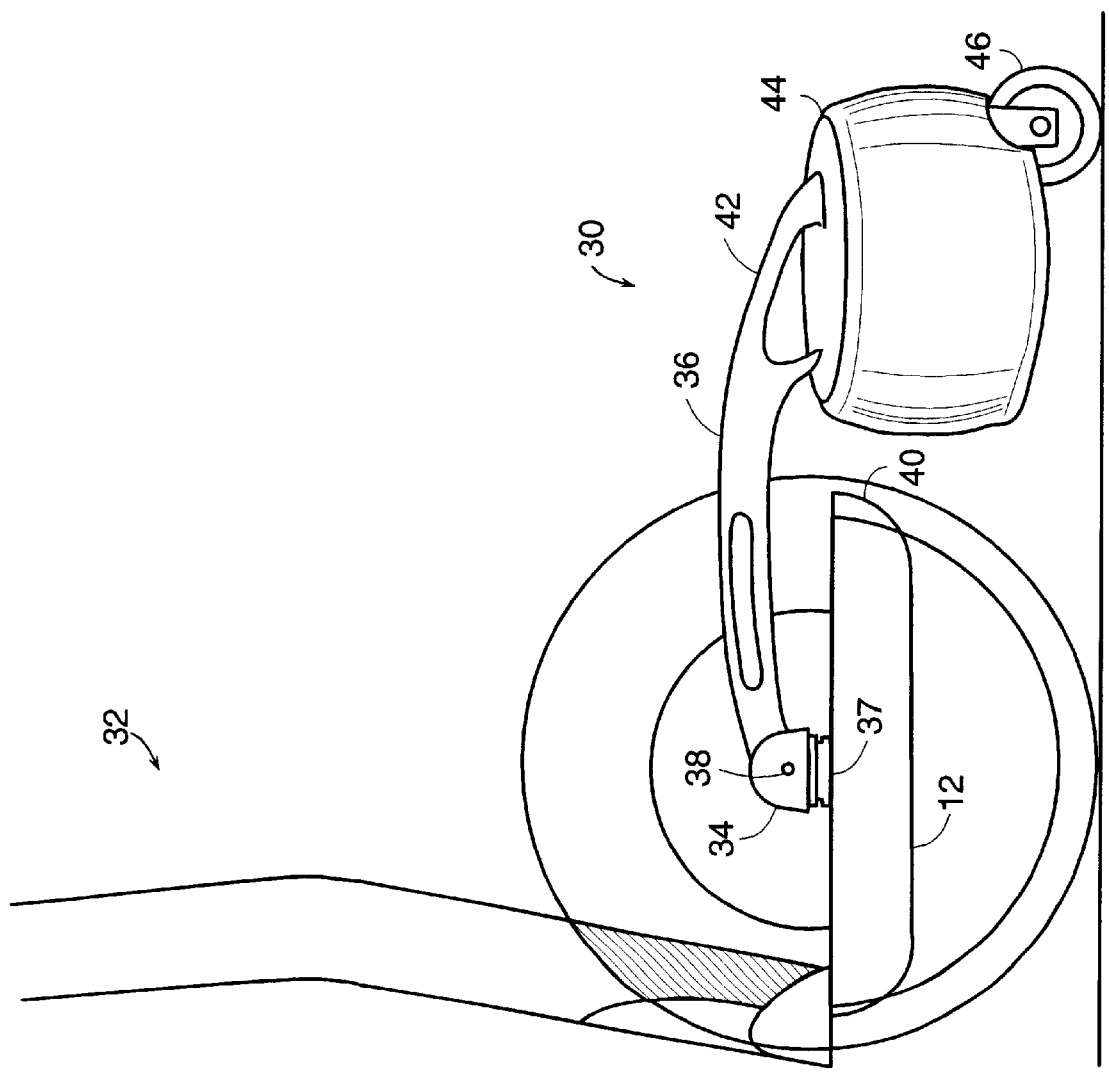
FIG. 2 is a side view of a trailer pivotably coupled to a dynamically balancing vehicle in accordance with an embodiment of the present invention.
Figure 3:
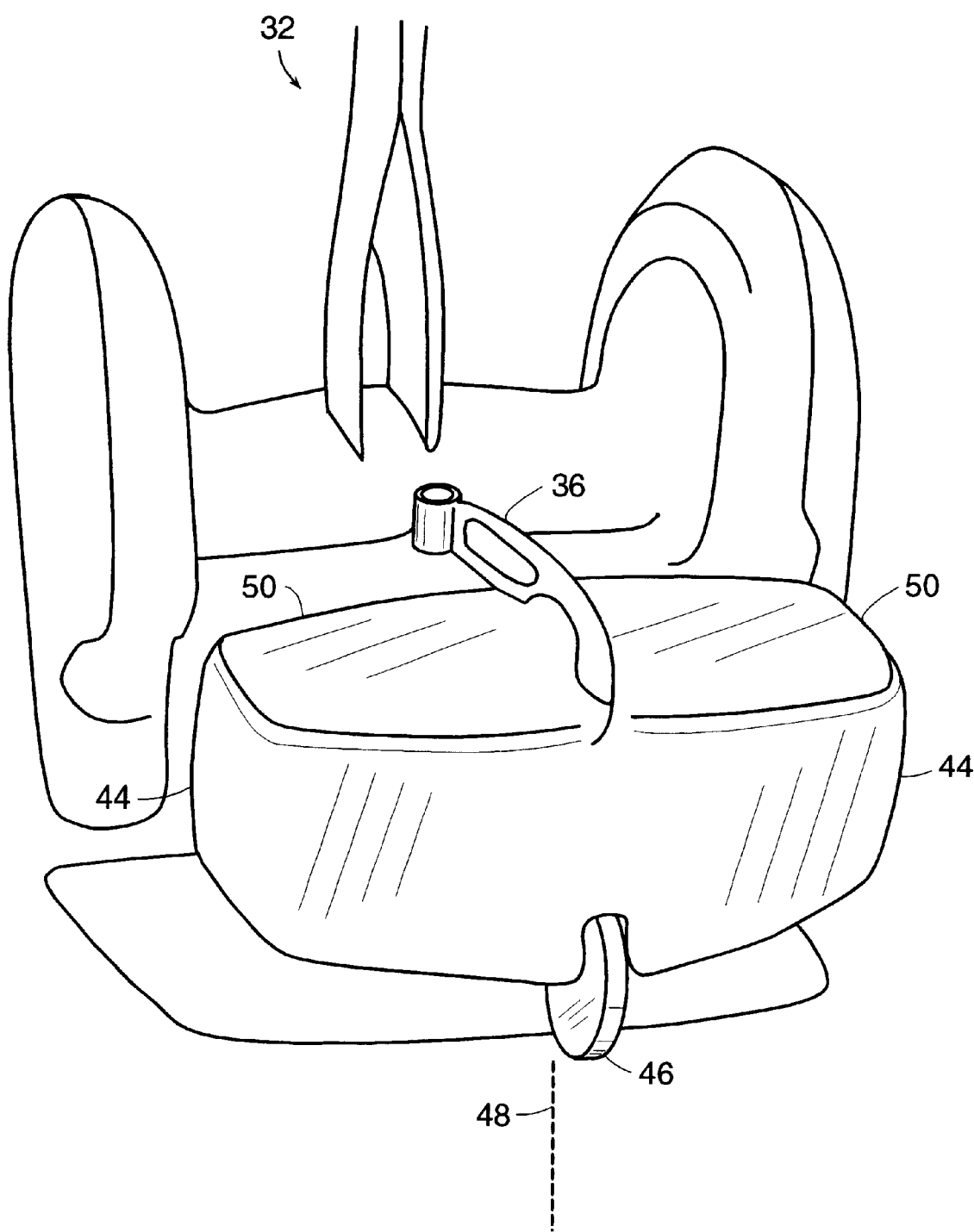
FIG. 3 is a perspective view of the trailer of FIG. 2.

Referring now to FIGS. 2 and 3, a side and perspective view are shown, respectively, of one embodiment of a trailer, designated generally by the numeral 30, that may be attached to a dynamically balanced personal transporter, designated generally by numeral 32. Trailer 30 is coupled to transporter 32 at an attachment housing 34 that is, in turn, fixedly coupled to support 12 of the transporter.

In the embodiment shown in FIGS. 2 and 3, trailer 30 has an arm 36 pivotally attached, at pivot end 37, to the attachment housing 34 and capable of rotating about a pivot axis 38 which is horizontal and perpendicular to the fore/aft-vertical plane (i.e., the plane of the paper in FIG. 2). In the embodiment shown in FIG. 2, arm 36 is shaped to avoid contact with support 12 when the rear edge 40 of the support is rotated upward in response to the rider leaning forward on the transporter. The opposite end, referred to herein as the 'container end' 42, of arm 36 is attached to a container 44. Container 44 may be as simple as a flat surface capable of supporting one or more packages or bundles. In a preferred embodiment, container 44 also has walls defining an enclosed space where packages or bundles that may be of odd shapes can be secured and protected from the environment during transportation by transporter 32.

In another embodiment of the invention, container 44 also includes a cover 50 (shown in FIG. 3) that covers the enclosed space of the container. The cover 50 may be completely detectable from container 44, or, alternatively, the cover may be hinged to a wall of the container. In a further embodiment, cover 50 may be locked to provide additional security for the contents of the container. FIG. 3 shows an embodiment wherein the container comprises two enclosed and covered spaces.

Container 44 is supported by at least one ground contacting member 46. In a preferred embodiment, the ground contacting member is a wheel. In a further embodiment, wheel 46 can swivel about a vertical axis 48 in response to turns made by the transporter 32. In yet another embodiment, the ground contacting member may be a ski.

Figure 4:
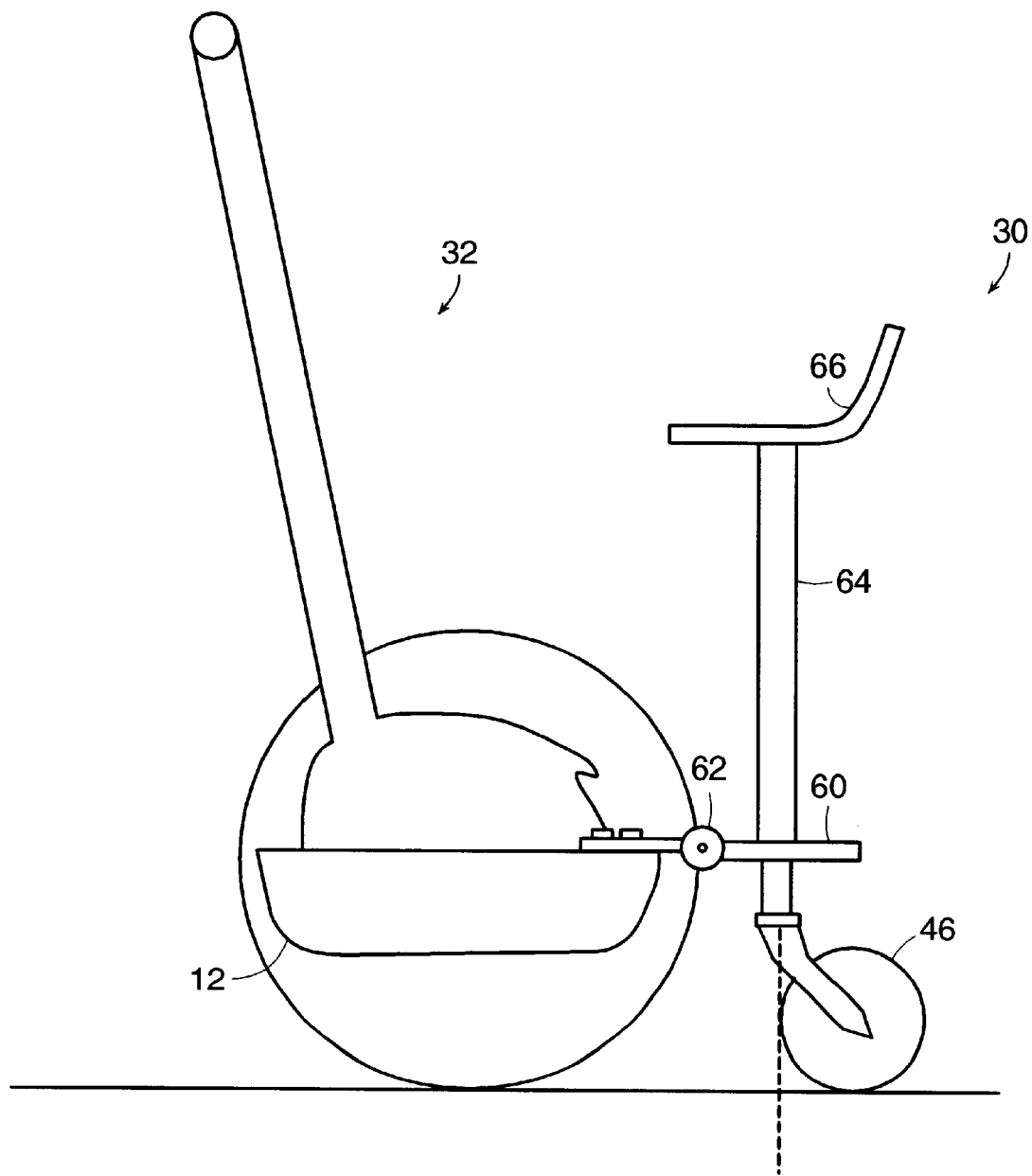
FIG. 4 shows a side view of a trailer coupled to a dynamically balancing vehicle by means of a pivot disposed rearward of the support platform of the vehicle in accordance with other embodiments of the invention.

Referring now to FIG. 4, a side view is shown of another embodiment of the invention wherein the relative placement and ordering of the trailer components differ from those of the embodiment depicted in FIGS. 2 and 3. In the embodiment of FIG. 4, attachment housing 48 is coupled at the rear of support 12. Attachment housing 34 extends beyond the rear edge of support 12 and is pivotally connected to the trailer base 60 at a pivot 62. Base 62 is supported by a ground-contacting member 46 which, in a preferred embodiment, is a wheel capable of swiveling about vertical axis 48. A support column 64 is fixedly attached to base 60 and supports a seat 66 that may support a passenger in a seated position while minimizing the effect of the trailer 30 on the leaning or tilting of the transporter 32. In a further embodiment of the present invention, support column 64 may also support containers or other payloads.

During normal operation, the pivot 62 remains free to pivot in the fore/aft-vertical plane. Pivot 62 allows transporter 32 to retain the control characteristics of a two-wheeled dynamically stabilized vehicle even though the transporter/trailer combination may be statically stable. In a fault condition where transporter 32 loses the ability to maintain dynamic stability, pivot 62 may be locked, by actuation of a solenoid, for example, in such a manner as to prevent trailer 30 from tipping forward and transporter 32 from tipping backward. The lock mechanism may be activated, in accordance with various embodiments of the invention, by a control signal or by power failure. The implementation of the pivot lock and activation of the lock is well known to one of ordinary skill in the mechanical art.

Figure 5A:
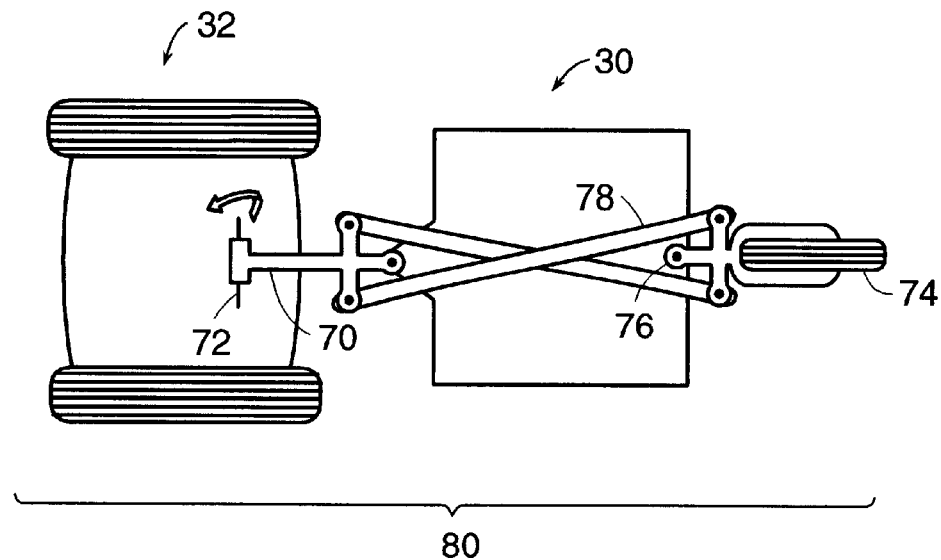
FIGS. 5a and 5b show bottom views of a trailer coupled to a dynamically balancing vehicle by means of a scissors linkage enabling the trailer to follow the balancing vehicle in a tight turn, in accordance with another embodiment of the invention.
Figure 5B:
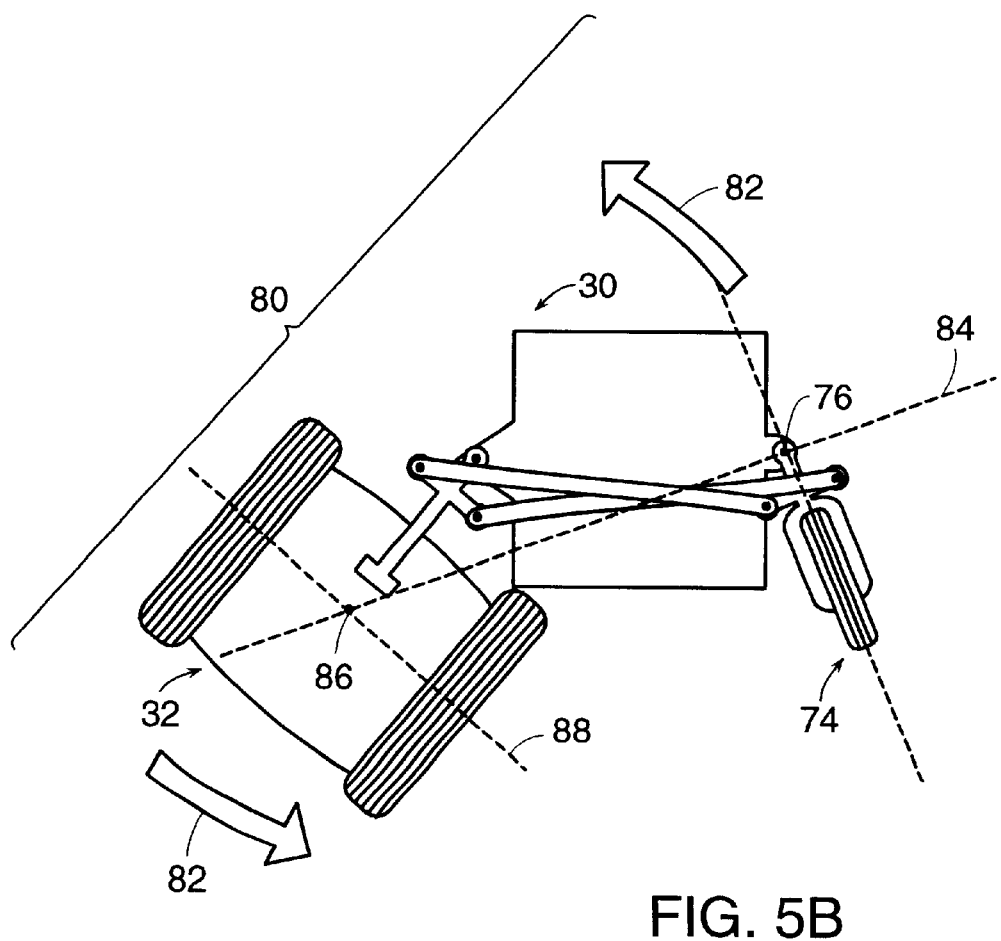

Alternate embodiments of the invention employ a scissors linkage as depicted in the bottom view shown in FIGS. 5a and 5b. Referring first to FIG. 5a, trailer 30 is, again, coupled to transporter 32, where transporter 32 is preferably a dynamically balancing vehicle. Coupling to transporter 32 may be by means of hitch 70 which pivots about horizontal (pitch) axis 72 to allow leaning of the transporter. In the embodiment shown in FIGS. 5a and 5b, trailer 30 rides on a single trailer wheel 74, however trailers with additional wheels or other ground-contacting elements, such as skids, for example, are within the scope of the present invention. Trailer wheel 74 pivots about a vertical (yaw) axis 76 to allow it to track as the transporter executes turns. Scissor linkage 78 provides for steering of wheel 74 to allow for tight turns of the coupled system 80 of transporter and trailer. In fact, as depicted in FIG. 5b, coupled system 80 of transporter 32 and trailer 30 may be rotated in place, as shown by arrows 82, to the degree that wheel 74 is perpendicular to line 84 connecting the center 86 of rotation axis 88 of transporter 32 to vertical axis 76 of steerability of wheel 74, at which point coupled system 80 may turn in place.

Figure 6A:
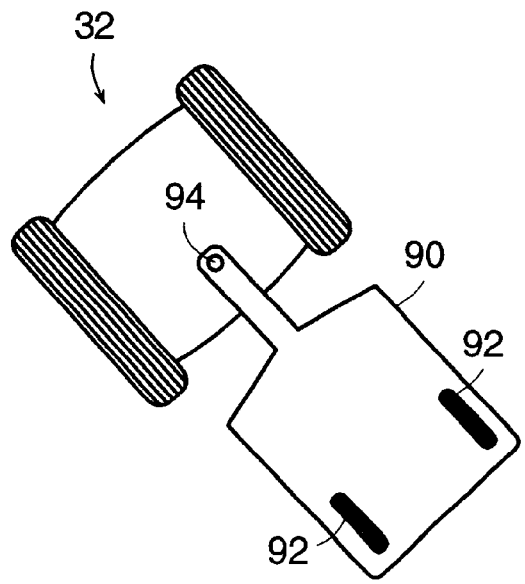
FIG. 6a is a top view of a two-wheeled trailer coupled to a dynamically balancing vehicle at a ball joint.
Figure 6B:
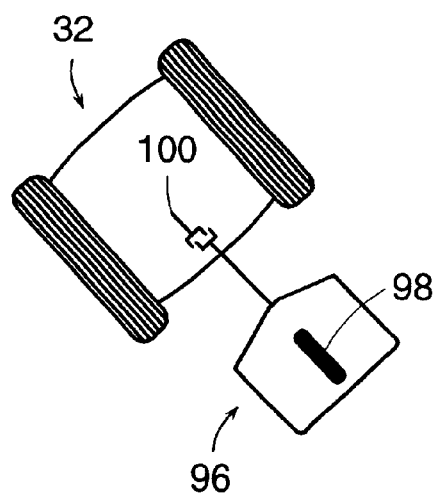
FIG. 6b is a top view of a one-wheeled trailer coupled to a dynamically balancing vehicle at a universal joint.

Referring now to FIG. 6a, a bottom view is shown of a further embodiment of the invention in which trailer 90 has two non-castering wheels 92 and trailer 90 is coupled to transporter 32 at ball joint 94, allowing rotation about all axes. In an alternate embodiment shown in FIG. 6b, trailer 96 is supported above the ground by a single non-castering wheel 98 and is coupled to transporter 32 at universal joint 100, permitting rotation about both pitch and yaw axes. Both of the embodiments of FIGS. 6a and 6b effectively decouple trailers 90 and 96, respectively, from fore/aft leaning of the transporter 32, which, as described above, may be used for control of the motion of the coupled systems. A further feature of the embodiments described is that trailers 90 and 96 and, more particularly, their platforms 60 (indicated in FIG. 4) may be sized to accommodate a person in either a standing or a seated position. In preferred embodiments of the invention, the platforms have a characteristic transverse linear dimension substantially comparable to the shoulder width of a user. Since the leaning of the respective trailer and transporter components are effectively decoupled, a passenger standing on the trailer need merely hold onto the driver of the transporter in order to maintain balance. Additionally, by exerting force on the driver of the transporter, it is possible for the passenger conveyed on the trailer to drive the coupled system.

Figure 6C:
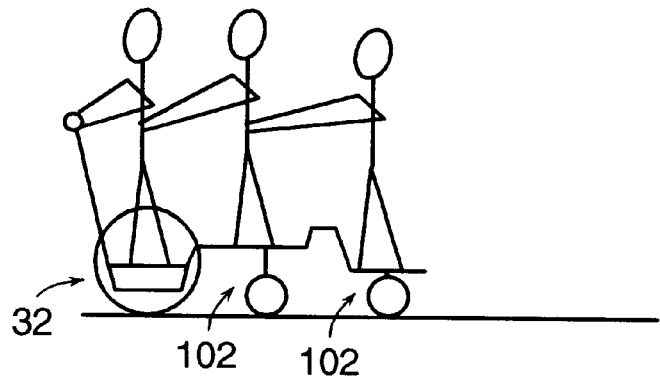
FIG. 6c shows a schematic view of multiple trailers drawn by a single dynamically balancing vehicle.

In accordance with an alternate embodiment of the invention depicted schematically in FIG. 6c, multiple trailers 102 may be attached to each other in series and drawn by a single transporter 32.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A trailer for carrying a user behind a dynamically balanced transporter, the trailer comprising:
   a) a platform for supporting the user in a standing position;
   b) a ground-contacting member supporting the platform, the ground-contacting member capable of swiveling about a vertical axis in a first rotation direction;
   c) a pivot arm having a pivot end with a pivot and a trailer end, the trailer end coupled to the platform, the trailer end capable of swiveling about a trailer end vertical axis in a trailer end rotation direction; and
   d) a scissor linkage coupled to the pivot arm and ground contacting member so that the first rotation direction is counter to the trailer end rotation direction.

2. A vehicle comprising:
   a) a dynamically balanced transporter having a support and an attachment housing coupled to the support; and
   b) a trailer further comprising:
      i) a platform, the platform having an upper side;
      ii) a ground-contacting member supporting the platform, the ground-contacting member capable of swiveling about a vertical axis in a first rotation direction;
      iii) a pivot arm having a pivot end with a pivot and a trailer end, the trailer end coupled to the platform, the trailer end capable of swiveling about a trailer end vertical axis in a trailer end rotation direction, the pivot coupled to the attachment housing; and
      iv) a scissor linkage coupled to the pivot arm and ground contacting member so that the first rotation direction is counter to the trailer end rotation direction.

\* \* \* \* \*